(12) United States Patent
Wiacek (10) Patent No.: US 11,445,466 B2
(45) Date of Patent: Sep. 13, 2022

(54) BASE STATION CONFIGURED TO PROVIDE DISTANCE FILTERING

(71) Applicant: Nokia Technologies Oy, Espoo (FI)

(72) Inventor: Fabian Wiacek, Warsaw (PL)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/969,820

(22) PCT Filed: Feb. 7, 2019

(86) PCT No.: PCT/FI2019/050092
§ 371 (c)(1),
(2) Date: Aug. 13, 2020

(87) PCT Pub. No.: WO2019/162562
PCT Pub. Date: Aug. 29, 2019

(65) Prior Publication Data
US 2020/0374830 A1    Nov. 26, 2020

(30) Foreign Application Priority Data

Feb. 23, 2018   (FI) ..................................... 20185172

(51) Int. Cl.
*H04W 28/02* (2009.01)
*H04W 74/08* (2009.01)
(Continued)

(52) U.S. Cl.
CPC .......... *H04W 64/003* (2013.01); *H04W 24/08* (2013.01); *H04W 28/0289* (2013.01); *H04W 74/0833* (2013.01)

(58) Field of Classification Search
CPC ... H04W 64/00; H04W 64/003; H04W 24/08; H04W 28/00; H04W 28/0289; H04W 74/0833
See application file for complete search history.

(56) References Cited

U.S. PATENT DOCUMENTS

| 7,817,999 B2 | 10/2010 | Tang et al. | |
| 2003/0171120 A1* | 9/2003 | Mustapha | H04W 12/122 455/445 |

(Continued)

FOREIGN PATENT DOCUMENTS

| EP | 2494826 A1 | 9/2012 |
| WO | 95/08896 A1 | 3/1995 |

(Continued)

OTHER PUBLICATIONS

"LTE; Evolved Universal Terrestrial Radio Access (E-UTRA); Physical layer; Measurements", (3GPP TS 36.214 version 11.0.0 Release 11), ETSI TS 136 214, V11.0.0, Oct. 2012, 16 pages.
(Continued)

*Primary Examiner* — Joseph E Dean, Jr.
(74) *Attorney, Agent, or Firm* — Alston & Bird LLP (57) ABSTRACT

A base station may be configured to support distance filtering. When the distance filtering is on, a base station may, when it receives a service request from a device, determine from timing information in the service request at least a distance to the device, then determine a filtering sub-area for the device based on the distance; and to apply one or more filtering rules defined for the filtering sub-area to determine how to process the service request.

21 Claims, 3 Drawing Sheets

(51) Int. Cl.
*H04W 64/00* (2009.01)
*H04W 24/08* (2009.01)

(56) References Cited

U.S. PATENT DOCUMENTS

| | | | | |
|---|---|---|---|---|
| 2006/0223441 | A1* | 10/2006 | Darwood | H04L 7/042 455/67.11 |
| 2009/0042582 | A1 | 2/2009 | Wang et al. | |
| 2011/0092195 | A1* | 4/2011 | Hussein | H04W 24/02 455/418 |
| 2012/0236737 | A1* | 9/2012 | Bergman | H04W 74/0833 370/252 |
| 2015/0043432 | A1* | 2/2015 | Zou | H04W 16/10 370/328 |
| 2016/0373464 | A1* | 12/2016 | Kikuchi | H04L 63/0263 |
| 2017/0078934 | A1* | 3/2017 | Balakrishnan | H04W 52/365 |

FOREIGN PATENT DOCUMENTS

| | | |
|---|---|---|
| WO | 97/35452 A1 | 9/1997 |
| WO | 02/065808 A1 | 8/2002 |
| WO | 2011/059689 A1 | 5/2011 |

OTHER PUBLICATIONS

"3rd Generation Partnership Project; Technical Specification Group Radio Access Network; Evolved Universal Terrestrial Radio Access (E-UTRA); Physical channels and modulation (Release 13)", 3GPP TS 36.211, V13.7.1, Sep. 2017, pp. 1-172.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)", 3GPP TS 36.300, V14.4.0, Sep. 2017, pp. 1-329.

"3rd Generation Partnership Project; Technical Specification Group Core Network and Terminals; Non-Access-Stratum (NAS) protocol for Evolved Packet System (EPS); Stage 3 (Release 15)", 3GPP TS 24.301, V15.0.1, Sep. 2017, pp. 1-496.

Office action received for corresponding Finnish U.S. Appl. No. 20/185,172, dated Nov. 6, 2018, 8 pages.

Ray et al., "Self-Tracking Mobile Station Controls Its Fast Handover in Mobile WiMAX", IEEE Wireless Communication and Networking Conference, 2010, 6 pages.

International Search Report and Written Opinion received for corresponding Patent Cooperation Treaty Application No. PCT/FI2019/050092, dated Apr. 29, 2019, 14 pages.

Office Action for Chinese Application No. 201880081596.9 dated Nov. 23, 2021, 11 pages.

Office Action for European Application No. 19709995.5 dated May 19, 2022, 8 pages.

* cited by examiner

BASE STATION CONFIGURED TO PROVIDE DISTANCE FILTERING

RELATED APPLICATION

This application was originally filed as PCT Application No. PCT/FI2019/050092, filed on Feb. 7, 2019, which claims priority to FI Application No. 20185172, filed on Feb. 23, 2018, each of which is incorporated herein by reference in its entirety.

TECHNICAL FIELD

Various example embodiments relates to wireless communications.

BACKGROUND

Wireless communication systems are under constant development. The need for faster communication and huge increase of the data amount create challenges for the wireless communications systems.

BRIEF DESCRIPTION

According to an aspect, there is provided the subject matter of the independent claims. Some embodiments are defined in the dependent claims.

An aspect provides a base station comprising means for detecting that a distance filtering is on, means for determining from timing information in a service request received from a device at least a distance to the device, means for determining a filtering sub-area for the device based on the distance, and means for applying one or more filtering rules defined for the filtering sub-area to determine how to process the service request.

Another aspect provides a base station comprising means for detecting that a distance filtering is on, means for determining from timing information in a random access channel preamble (service request) received from a device at least a distance to the device by determining the distance based on guard time in the random access channel preamble, or based on timing advance information calculated based on the random access channel preamble, means for determining a filtering sub-area for the device based on the distance, and means for applying one or more filtering rules defined for the filtering sub-area to determine how to process the service request.

In a further aspect, a base station according to any previous aspect further comprises means for detecting one or more areas with an extensive demand on resources, means for setting the distance filtering on in response to detecting an area with an extensive demand, and means for indicating for each area with an extensive demand a minimum range and a maximum range.

In a still further aspect, in a base station according to the preceding aspect, the means for detecting one or more areas with an extensive demand on resources are configured to be responsive to one or more of the following: detecting that demand for radio resources exceeds a threshold for capacity, detecting that number of service requests received from a relative small area exceeds a corresponding threshold, detecting a jamming device attack, detecting that a base station providing smaller cell that is at least partly within coverage area of the base station is out of order.

Another aspect provides a base station according to any previous aspect, wherein the base station further comprises means for receiving filtering subarea configurations including filtering sub-area definitions for one or more layers and one or more rules to apply.

In a still further aspect, in a base station according to the preceding aspect, the filtering sub-area configurations are for preventive coverage deployment.

In another aspect, in a base station according to the preceding aspect, the preventive coverage deployment is for interoperability between GSM and/or LTE and/or 5G.

Another aspect provides a base station according to any previous aspect, wherein the base station further comprises means for setting the distance filtering on in response to receiving corresponding instructions.

Another aspect provides a base station according to any previous aspect, wherein the base station further comprises means for determining, in response to an indication of a filtering sub-area with an extensive demand on resources, that the rule to apply for the filtering sub-area is not to send a response to the response request.

Another aspect provides a base station according to any previous aspect, wherein the one or more filtering rules comprise filtering sub-area-specific logical values and the base station is configured to multiply an input message received from the device using the logical value of the determined filtering sub-area.

Another aspect provides a base station according to any previous aspect, wherein the base station further comprises one or more memories for storing two or more filtering rules and information on which one of the filtering rules to apply to a filtering sub-area.

Another aspect provides a base station according to any previous aspect, wherein the base station further comprises means for collecting statistical data on service request filtering sub-area-specifically.

It should be appreciated that any of the above aspects may be implemented by a base station comprising at least one processor; and at least one memory including computer program code, the at least one memory and computer program code configured to, with the at least one processor, cause the performance of the base station according to any previous aspect.

Still another aspect provides a base station comprising at least one processor; and at least one memory including computer program code; the at least one memory and computer program code configured to, with the at least one processor, cause the base station at least to perform: detecting that a distance filtering is on; determining from timing information in a service request received from a device at least a distance to the device; determining a filtering sub-area for the device based on the distance; and applying one or more filtering rules defined for the filtering sub-area to determine how to process the service request.

An aspect provides a method comprising: detecting that a distance filtering is on, determining from timing information in a service request received from a device at least a distance to the device, determining a filtering sub-area for the device based on the distance, and applying one or more filtering rules defined for the filtering sub-area to determine how to process the service request.

Another aspect provides a method comprising: detecting that a distance filtering is on, determining from timing information in a random access channel preamble received from a device at least a distance to the device based on guard time or on timing advance information calculated based on the random access channel preamble decoding, determining a filtering sub-area for the device based on the distance, and applying one or more filtering rules defined for the filtering sub-area to determine how to process the service request.

Still a further aspect provides a method comprising detecting one or more areas with an extensive demand on resources, setting the distance filtering on in response to detecting an area with an extensive demand, and indicating for each area with an extensive demand a minimum range and a maximum range. The method of this aspect may be combined with the method of any previous aspects.

It should be appreciated that a computer readable medium comprising program instructions stored thereon for performing any of the methods or base station capabilities described above may be provided. Further, the computer readable medium may be a non-transitory computer readable medium.

Another aspect provides a computer program comprising instructions stored thereon, or for performing, in response to a distance filtering being on, at least the following: determining from timing information in a service request received from a device at least a distance to the device, determining a filtering subarea for the device based on the distance, and applying one or more filtering rules defined for the filtering sub-area to determine how to process the service request.

Still another aspect provides a computer program comprising instructions stored thereon, or for performing, in response to a distance filtering being on, at least the following: determining from timing information in a random access channel preamble received from a device at least a distance to the device based on guard time in the random access channel preamble, or based on timing advance information calculated based on the random access channel preamble, determining a filtering sub-area for the device based on the distance, and applying one or more filtering rules defined for the filtering sub-area to determine how to process the service request.

One or more examples of implementations are set forth in more detail in the accompanying drawings and the description below. Other features will be apparent from the description and drawings, and from the claims.

BRIEF DESCRIPTION OF DRAWINGS

In the following, example embodiments will be described in greater detail with reference to the attached drawings, in which.

DETAILED DESCRIPTION OF SOME EMBODIMENTS

The following embodiments are only presented as examples. Although the specification may refer to "an", "one", or "some" embodiment(s) and/or example(s) in several locations of the text, this does not necessarily mean that each reference is made to the same embodiment(s) or example(s), or that a particular feature only applies to a single embodiment and/or example. Single features of different embodiments and/or examples may also be combined to provide other embodiments and/or examples.

Embodiments and examples described herein may be implemented in any communications system comprising wireless connection(s). In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), beyond 5G, wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
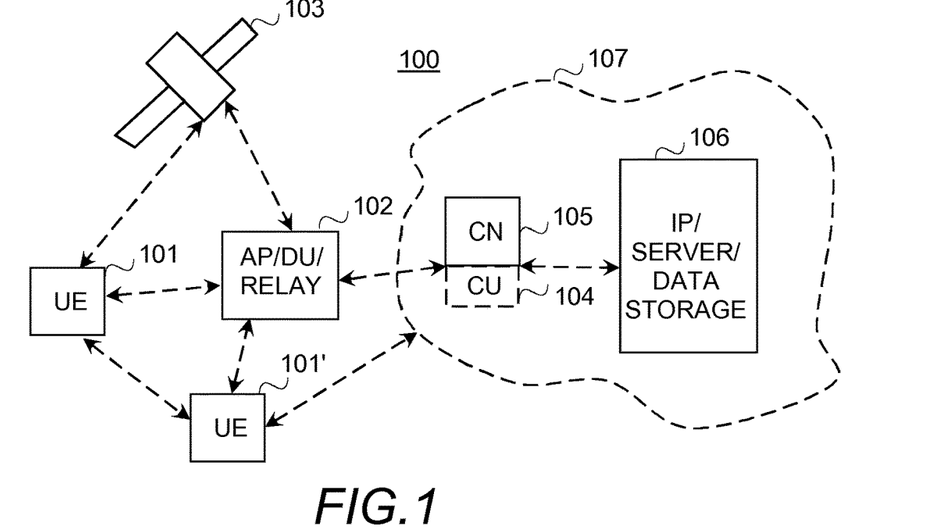
FIG. 1 illustrates an exemplified wireless communication system.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 101 and 101' configured to be in a wireless connection on one or more communication channels in a cell with an access node (such as (e/g)NodeB) 102 providing the cell. An example of an access node and a cell provided is described in more detail with FIG. 2. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system 100 typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 105 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilise cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes or corresponding network devices than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 106, or utilise services provided by them. The communication network may also be able to support the usage of cloud services, for example at least part of core network operations may be carried out as a cloud service (this is depicted in FIG. 1 by "cloud" 107). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 102) and non-real time functions being carried out in a centralized manner (in a centralized unit, CU 104).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 103 in the mega-constellation may cover several satellite-enabled network entities that create on-ground cells. The on-ground cells may be created through an on-ground relay node 102 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Below different exemplified examples are described using term base station as a generic term for access points, such as (e/g)NodeBs.

Figure 2:
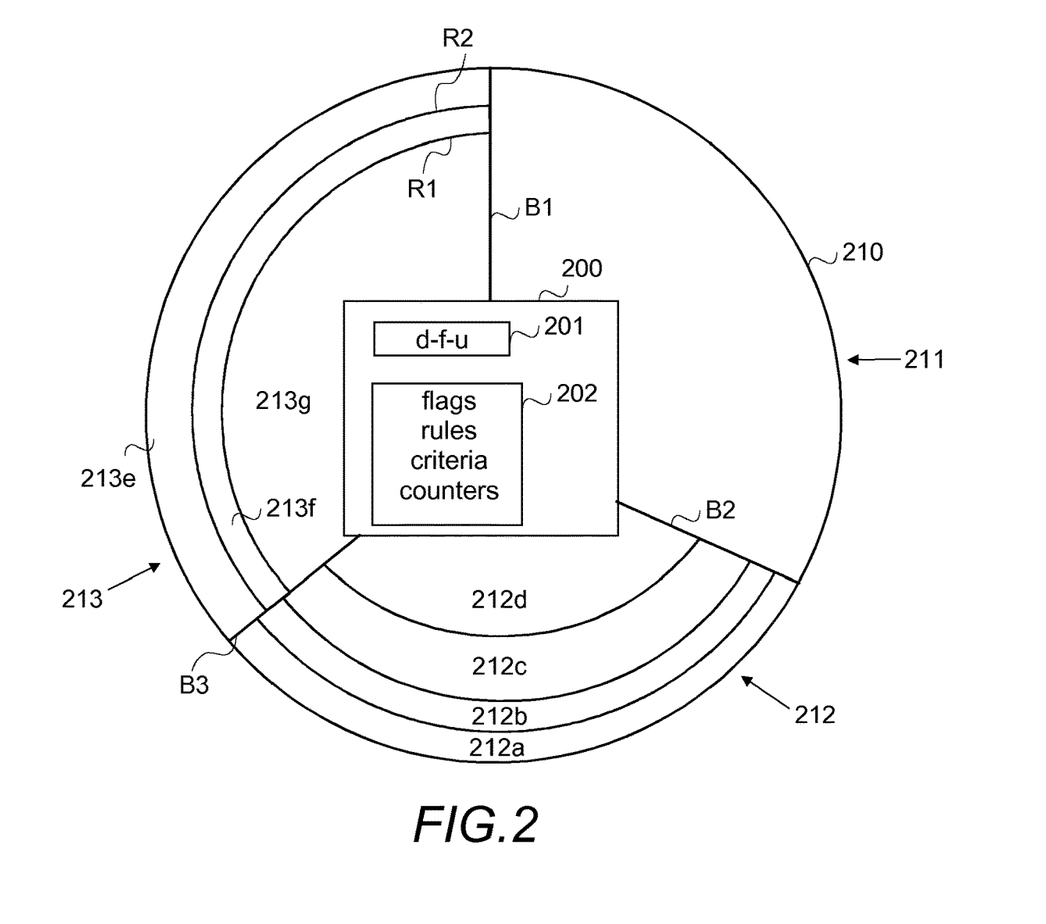
FIG. 2 is a schematic block diagram.

FIG. 2 illustrates an example of a base station configured to implement distance filtering. The base station 200 provides service coverage 210, typically called a cell, depicted by a circle in FIG. 2. In the illustrated example of FIG. 2, it is assumed that an antenna mast for the base station locates at the central point of the cell and comprises three directional antennas, for example sectorized antennas, to provide the coverage, each antenna covering a 120° sector 211, 212, 213, separated in the FIG. 2 by borderlines B1, B2, B3 between the sectors. However, it should be appreciated that this is just an example, and any number of directional antennas, resulting to any number of sectors, possible with varying sizes, may be used, or instead of directional antennas an omnidirectional antenna may be used.

In the illustrated example of FIG. 2, each of the sectors are treated as separate coverage areas, without restricting the example and its teaching to such a solution. A coverage area may also comprise two or more sectors. It is even possible to treat the service coverage as one coverage area, regardless to how many sectors it is divided, if divided to sectors.

Referring to FIG. 2, a coverage area corresponding to the sector 211 does not comprise any filtering sub-areas, whereas a coverage area corresponding to the sector 212 comprises four filtering sub-areas 212*a*, 212*b*, 212*c*, 212*d*, and a coverage area corresponding to the sector 213 comprises three filtering sub-areas 213*e*, 213*f*, 213*g*. A filtering sub-area means an area defined by two ranges (distances) R1, R2 from the antenna mast. The shorter range R1, which may be called a minimum range of the sub-area, may be zero and is always less than the coverage range. The longer range R2, which may be called a maximum range of the sub-area, is always more than zero and may be the coverage range. For example, in the illustrated example the longer range of the filtering sub-area 212*a* is the same as the coverage range. Different examples how to define R1 and R2 are given below.

The base station 200 is configured to support distance filtering, which may be called also range filtering or distance range filtering. For that purpose the base station 200 comprises a distance filtering unit (d-f-u) 201 and in a memory 202 there are distance filtering configuration data, and other information relating to distance filtering.

In the illustrated example, information relating to distance filtering comprises flags, one for each coverage area. A flag, that may be also called as distance filtering flag, or range filtering flag, indicates whether a distance filtering functionality is on or off for the coverage area in question. In another implementation, a common flag for coverage areas may be used, or a flag may be sub-area specific. Naturally, any other type of information than the flag may be used to indicate whether the distance filtering functionality is on or off. When a distance filtering functionality is on, extensive demand of resources, or any corresponding situation, like preventive coverage deployment, within a relative small area within the coverage area has been detected. For example, there is a spontaneous mass event during which plurality of user devices request resources, or data transmissions to couple of user devices require lot of radio resources, within a relative small area, or there is a jamming attack device, or a base station providing a smaller coverage area at least partly within the coverage area of the base station, is not providing coverage for some reason. There are also other reasons that causes that the base station, or system maintenance, or the operator may set the distance filtering functionality on.

The information relating to distance filtering may also comprise, when the distance filtering is on, information on at least R1 and R2 of one area that may be considered as an extensive demand area, i.e. an area in which service request are treated differently compared to a situation in which the distance filtering is off, or other information by means of which separation between the different at least two filtering sub-areas (one of which at least is the extensive demand area) may be determined.

In the illustrated example, the configuration data (settings) comprises rules which to apply when the distance filtering functionality, or shortly distance filtering, is on. There are no restrictions to the rules. Further, it should be appreciated that the rules, or some of them, may be preset after cell deployment and/or the rules, or some of them may be dynamically or manually set by an operator. Furthermore, self-adapting decisive algorithm(s) may be used to define/ update the rules, or some of them. Some examples to illustrate, not to limit, the rules are listed below. In the examples it is assumed that a filtering sub-area is either an extensive demand area (maybe called also a filter area) or a normal demand area. For example, in sector 213 the subarea 213*f* may be an extensive demand area, and subareas 213*e* and 213*g* both normal demand areas.

In a single layer cell deployment scenario there may be two rules: a first rule applied to user devices within a normal demand sub-area, i.e. a filtering subarea that is a normal demand area, and a second rule applied to user devices within an extensive demand sub-area, i.e. a filtering sub-area that has been detected as an extensive demand area. The first rule may be "no filtering", i.e. access and resources are provided as if the distance filtering were off. The second rule may be "no access to provided resources". Other examples for the second rule include "allocate only part of maximum capacity, such as 70%; use sensitivity and settings, such as signal to noise ratio, of a lower service level; decrease connection priorities of certain radio bearers, if there are user devices with different priorities. Still a further example is that the first rule for the normal demand sub-area is "allocate X %, e.g. 90% or 60%, of total capacity to user devices in the normal demand area(s)" and the second rule for the extensive demand area(s) is "allocate 100–X %, e.g. 10% or 40%, of total capacity to user devices in the extensive demand area". The advantage of having a rule allowing some capacity to the extensive demand area user devices in the extensive demand area may receive services from the base station.

In a multi-layer cell deployment scenario even more versatile rules, and more complicated, if needed, may be defined. For the sake of clarity, in the following non-limiting examples it is assumed, unless otherwise stated, that three layers are deployed, their coverage area is the same, as well as the filtering sub-areas, and in a normal situation (i.e the distance filtering is off) radio resource demands from user devices are allocated in the coverage on equally basis. Implementing the examples to other kind of situations, for example to different filtering sub-areas, and/or other kind of rules is a straightforward process for one skilled in the art.

An example of the rules for the multi-layer may be that user devices within an extensive demand area of a layer are handled by one of the three layers and user devices within a normal demand area of a layer are handled by the other two layers. For example, assuming that there are three layers, A, B and C, each having sub-layers corresponding to those of the sector 213, user devices whose distance to the base station is between R1 and R2 would be served by layer A, other user devices by layers B and C.

Another example is to multiply base station input messages with a logical value of a range filter, the logical value being different for different distances. For example, assuming that there are three layers, A, B and C, each having sub-layers corresponding to those of the sector 213, the logical value for layer A may be zero to distances starting from the antenna mast up to R1, one to distances between R1 and R2, and zero between R2 and maximum coverage range, and the logical value for layers B and C may be one to distances starting from the antenna mast up to R1, zero to distances between R1 and R2, and one between R2 and maximum coverage range. The logical value one means that data remains unchanged, and the logical value zero means that data will be zeroed. From the base station point of view the above example means that in case of the layer A transmissions received from 213*e* and 213*g* will not be served, transmission received from 213*f* will be served, whereas in case of the layer B and the layer C, transmissions received from 213*e* and 213*g* will be served and transmission received from 213*f* will not be served.

Another example of the rules for the multi-layer deployment scenario is that user devices within an extensive demand area of a layer are handled by two of the three layers and user devices within a normal demand area of a layer are handled by the remaining one of the three layers. Using the above example referring to the sector 213, user devices whose distance to the base station is between R1 and R2 would be served by layer A and layer B, other user devices by layer C.

The idea to multiply base station input messages with a logical value of a range filter, the logical value being different for different distances, may also be applied for the above scenario. For example, assuming that there are three layers, A, B and C, each having sub-layers corresponding to those of the sector 213, the logical value for layer A and for layer B may be zero to distances starting from the antenna mast up to R1, one to distances between R1 and R2, and zero between R2 and maximum coverage range, and the logical value for layer C may be one to distances starting from the antenna mast up to R1, zero to distances between R1 and R2, and one between R2 and maximum coverage range. From the base station point of view the above example means that in case of the layer A and the layer B transmissions received from 213*e* and 213*g* will not be served, transmission received from 213*f* will be served, whereas in case of the layer C transmissions received from 213*e* and 213*g* will be served and transmission received from 213*f* will not be served.

Yet another example of the rules for the multi-layer deployment scenario, especially suitable when multi-layer coverage is provided from co-located cells, is that in case of three layers, all user devices are served by two of the layers, either by the layer A and the layer B or by the layer A and the layer C, in a similar manner (but always in a different way by the layer B and the layer C). For example, the layer A may correspond to the sector 211, i.e. have one filtering (sub)-area that is the same as coverage area, and the layers B and C may comprise two filtering sub-areas, one corresponding to filtering sub-area 212*a* and the other one corresponding to a combination of sub-areas 212*b*, 212*c* and 212*d*. The rule may be that user devices locating in the filtering sub-area corresponding to 212*a* will be served by the layer A and the layer C, but not by the layer B, or served by the layer B with a poorer service level, and user devices locating in the other filtering sub-area (corresponding to the combination of sub-areas 212*b*, 212*c* and 212*d*) will be served by the layer A and the layer B, but not by the layer C, or served by the layer C with a poorer service level. This results to capacity and data throughput rate enhancing in the filtering sub-areas, compared to a situation in which no division to filtering sub-areas have been performed. In other words, if the distance filtering is not applied, and there is high resource demand, all layers may be heavily loaded with similar level of request, and eventually they may be saturated. If the distance filtering is applied and the high resource demand is within one filtering sub-area, the negative impact may be narrowed only to the filtering sub-area, and outside the sector no negative or minor negative impact may be caused.

The idea to multiply base station input messages with a logical value of a range filter, the logical value being different for different distances, may also be applied for the above scenario. For example, using the above example relating to the sectors 211 and 212, the logical value for the layer A may be one to all distances, i.e. starting from the antenna mast up to the maximum coverage range, the logical value for the layer B may be one to distances starting from the antenna mast up to R1 of the sub-area 212a and zero between R1 of the sub-area 212a and the maximum coverage range, and the logical value for layer C may be zero to distances starting from the antenna mast up to R1 of the sub-area 212a and one between R1 of the sub-area 212a and the maximum coverage range. From the base station point of view the above example means that in case of the layer A the transmission will be served regardless where there are reserved (naturally within the coverage area), the layer B transmissions received from 212a will not be served, transmission received elsewhere within the coverage area will be served, whereas in case of the layer C transmissions received from 212a will be served and transmission received elsewhere will not be served. Basically this means that all resources of layer B, and correspondingly layer C, will be offered within a limits of one filtering sub-area, which is smaller than the coverage area, while the capacity remains the same. This results to capacity and data throughput rate enhancing in the filtering sub-areas, as explained above.

Further rules, for example rules corresponding to the above listed non-limiting examples of the second rule in the single layer cell deployment scenario, for the layer handling the user devices within the extensive demand area in the multi-layer cell deployment scenario may be provided.

The above rules may be used with carrier aggregation, assuming that layer A corresponds to the primary cell in the carrier aggregation and layers B and C to the secondary cells. (In the carrier aggregation, multiple carriers, called component carries, are aggregated to form a larger overall transmission bandwidth. When the carrier aggregation is used there are a number of serving cells, one for each component carrier, and the serving cell handling the radio resource control connection is the primary cell, others are secondary cells.)

In addition to the one or more rules, the configuration data may comprise criteria, such as triggers, when to set the distance filtering flag on. One example is that if the demand exceeds the capacity, or a certain amount Z, like 90%, of the capacity, the distance filtering flag is set on, and filtering sub-areas are determined. Another example is that if it is detected that at a certain area of limited size the number of service requests, such as preambles (random access preamble) sent over a random access channel (RACH) to the base station, exceeds a threshold, like X % of the random access capacity, the distance filtering flag is set on, and filtering sub-areas are determined based on the certain area. Further, coverage analysis may cause that the filtering flag will be set on for preventive coverage deployment. The triggers may be set area-specifically, for example a first trigger value for non-specified area and a second trigger value for areas, common value or area-specific value, or any combination, where a large number of service requests may be expected. A non-limiting list of some examples of such areas include cell boundaries, location of obstacles blocking propagations, buildings, underground entry points, etc. Still a further trigger include in case of a cell deployment having a macro cell and one or more smaller cells at least partly within the coverage of the macro cell, that if it is detected that the smaller cell is out of service, the distance filtering flag is set on, and the filtering sub-areas are based on the coverage area of the smaller cell.

Depending on the criteria, the information relating to distance filtering may also comprise one or more counters, or more precisely, counter values, keeping track on numbers for the one or more triggers.

The coverage area may be pre-divided (preconfigured) into consecutive, possible initial, filtering sub-areas, either having a constant difference between the maximum and the minimum range, or a varying difference. Such subareas may be called range rings. For example sub-area 0 from the antenna mast to a range r1, sub-area 1 from the range r1 to a range r2, which is r1+r1, sub-area 2 from r2 to r3, which is r2+r1, etc., or to varying size of ranges, as the sub-areas 212a, 212b, 212c, 212d in the sector 212. When a timing advance type 2 defined by ETSI to LTE as a time difference between transmission time and reception time of a radio frame in the base station (i.e. a time difference between a time the base station received a radio frame and a time the base station transmitted the radio frame), is used the constant difference may be, for example, 550 m that corresponds to a timing advance correction of timing advance type in the second generation mobile system called GSM. With such a distance the solution provides compatibility to systems utilizing different generations, like GSM/LTE/5G, thereby facilitating interworking and coverage optimization, especially for the preventive coverage deployment, between layers provided by 5G/LTE/GSM, or any different technologies used for wireless coverage. Naturally, any other constant difference may be used, and there may be one constant difference for GSM, one for LTE, one for 5G, or one for LTE and 5G, just to list some possibilities without restricting the solutions to such implementations. When pre-configured filtering sub-areas (range rings) are used, the configuration data and/or the information relating to distance filtering may comprise coverage-area-specifically, or layer-specifically, or cell-specifically, or as a common configuration for all cells/layers or for all cells/layers having substantially the same maximum coverage range, for example one or more pieces of following information, some of which may be collected as a background information, for each sub-area:

distance filtering flag on or off for the sub-area (range ring), and in an example, if the flag is on it means that no answer is sent to service requests, and if the flag is off, it means that the request is processed normally (e.g. the base station sends a time advance correction to the device)

statistics, such as information on occupancy at different time periods, like 1 second, 1 minute, 1 hour and 24 hours, with respect to a maximum cell capacity (occupancy meaning, for example, how many resource request were responded or received or the amount of resources allocated to the sub-area in question)

overload criteria (providing sub-area specific tailoring, e.g. when to response normally to service requests and when not to response service request)

coverage redundancy, such as information on presence of other cells which could support or handle traffic hot spots, such as information on whether peak radio demands may be expected as a result of a specific cell deployment any other information, like comments comprising important notes In other words, it is possible to configure distance-specific/pre-configured sub-area specific rules how to handle the request. Further, the statistic information collected may be used to detect jamming attacks, and/or by self-adapting algorithms, and/or by an operator to update for example overload criteria or the one or more rules.

Figure 3:
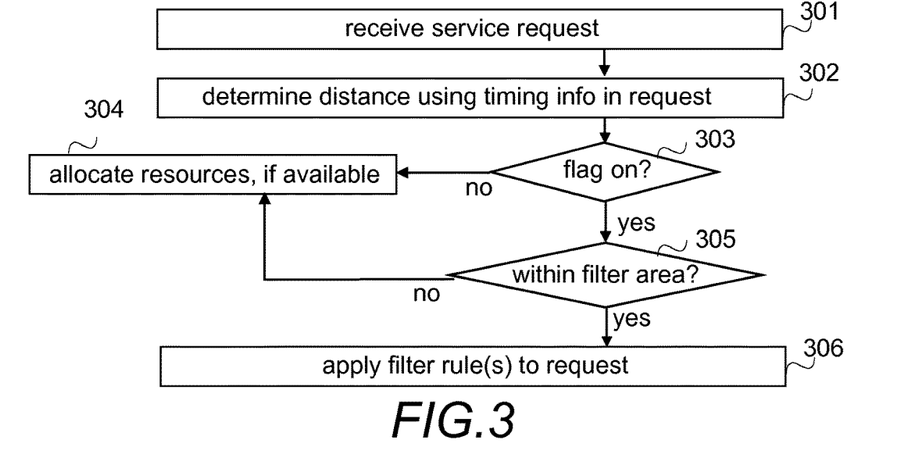
FIGS. 3 to 7 illustrate exemplified processes.
Figure 4:
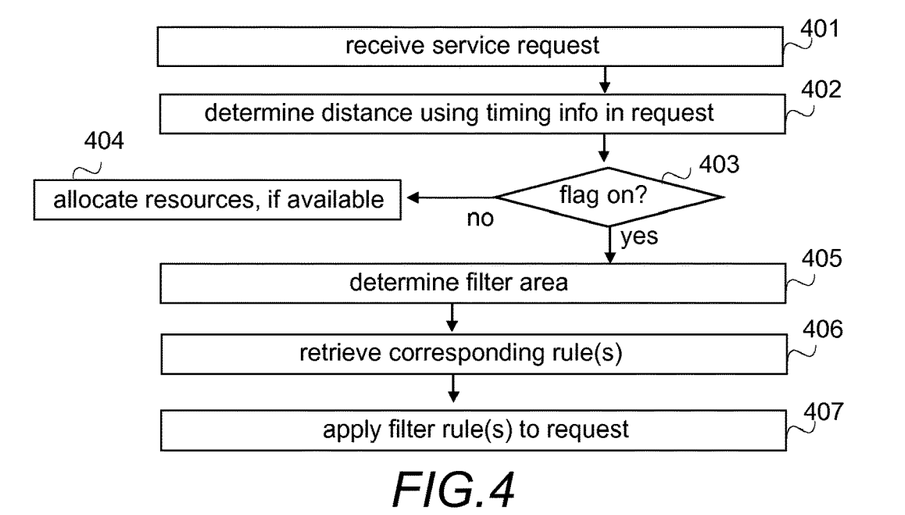
Figure 5:
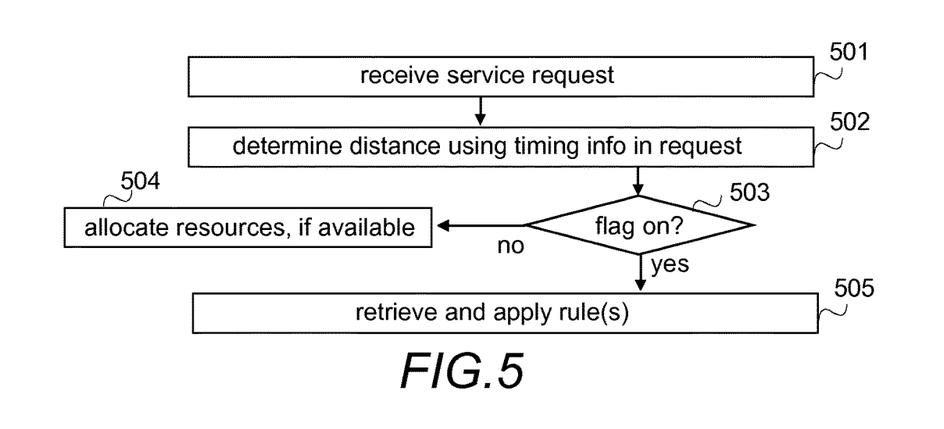

FIGS. 3, 4 and 5 illustrate different examples of how to implement the distance filtering in a base station. More precisely, they illustrate example functionalities of the distance filtering unit. The illustrated functionalities may be implemented in a physical layer, for example. When the functionality is implemented in the physical layer, the base station resources are loaded as little as possible in the filter area (extensive demand area) since the base station may send no response, depending on the one or more rules to apply. For example, in case of the radio jamming attacks the advantage is significant and helps to avoid severe load of the base station resources.

In the example illustrated in FIG. 3, a filtering sub-area is either a normal area, or a filtered area, wherein a first rule is applied to the normal area, the first set of rules being "act as if no distance filtering is on", and a second rule, or a second set of rules, is applied to an area indicated as "to be filtered", or "filter area", or "extensive demand area". Examples of such a rule and a set of rules are given above. For example, referring to FIG. 2 and the sector 213, area to be filtered may be defined by R1 and R2 of the filtering sub-area 213*f*, whereas the filtering sub-areas 213*e* and 213*g* form the normal area.

Referring to FIG. 3, when a service request is received in block 301 the distance between the base station and the user device which sent the request is determined in block 302, using timing information in the request. For example, if the request (service request) is a PRACH (physical random access channel) preamble whose length is shorter than the PRACH slot reserved for the request to provide room for a guard time (GT), also called guard period, to absorb propagation delay between the user device and the base station. Since the propagation delay, and the length of a guard time in a request, depends on the distance between the user device and the base station, the guard time may be used to determine the distance, or a PRACH preamble is decoded, and the timing advance information calculated by the base station based on the guard time, for example, to ensure uplink synchronization between the user device and the base station, may be used to determine the distance. It should be appreciated that the base station may be configured to determine the distance based on any of technology used for wireless access that conveys some timing information to the base station based on which timing information the distance is determinable.

It should be appreciated that the distance obtained this way is accurate enough, since the accuracy is within decameters, for example by using the type 2 timing advance information, the distance may be estimated with an accuracy about 10 m.

After the distance has been determined, it is checked in block 303 whether or not the distance filtering flag is on. If the flag is not on (block 303: no), the process continues normally in block 304 by allocating resources to the requested service, if there are resources available.

If the flag is on (block 303: yes), it is checked in block 305, whether or not the distance is within a filter area (extensive demand area). In other words, if one filter area has been indicated, it is checked, whether or not the distance is between R1 and R2 of the filter area. Naturally, if more than one filter area has been indicated, it is checked, whether or not the distance is between R1 and R2 of one of the filter areas.

If the distance indicates that the user device is not within the filter area (block 305: no), the user device is in a sub-area that is considered as normal, and the process proceeds to block 304 to allocate resources to the requested service.

If the user device is within the filter area (block 305: yes), the defined one or more filter rules are applied in block 306 to the request. If the filter rule is that no resources should be allocated to user devices within the filter area, the base station may inform the user device that access to radio resources is denied, or the base station may send no response to the request. Both results to the known procedure: the user device will try to gain access either again to the cell or to another cell accessible by the user device. In other words, no changes to the functionality of the user device is required. The same applies if the base station responses by allocated resources that do not fulfill the requested resources.

In the example illustrated in FIG. 4, more versatile filtering sub-area configurations may be used as with FIG. 3. Referring to FIG. 4, when a service request is received in block 401, the distance between the base station and the user device which sent the request is determined in block 402, using timing information in the request. The distance may be determined as described above with block 302. Then it is checked in block 403 whether or not the distance filtering flag is on. If the flag is not on (block 403: no), the process continues normally in block 404 by allocating resources to the requested service, if there are resources available.

If the flag is on (block 403: yes) a filter sub-area is determined in block 405 using the distance. The filter sub-area is the one between whose R1 and R2 the distance is. Then the one or more rules to apply in this specific filtering sub-area are retrieved in block 406, and applied to the request in block 407. (The filtering sub-area may be a normal demand sub-area or filter area, i.e. an extensive demand area.)

The example illustrated in FIG. 5 may be applied to the solution in which the range rings are implemented, with range ring (i.e. filtering sub-area) specific flags. Naturally the functionality may be implemented with other kind of filtering sub-area configurations.

Referring to FIG. 5, when a service request is received in block 501, the distance between the base station and the user device, which sent the request, is determined in block 502, using timing information in the request. The distance may be determined as described above with block 304. Then, using the distance, it is checked in block 503 whether or not the distance filtering flag is on for a filtering sub-area within which, based on the distance, the user device locates. If the flag is not on (block 503: no), the process continues normally in block 504 by allocating resources to the requested service, if there are resources available.

If the flag is on (block 503: yes), the one or more rules to apply in this specific area are retrieved in block 505, and applied to the request in block 505.

Figure 6:
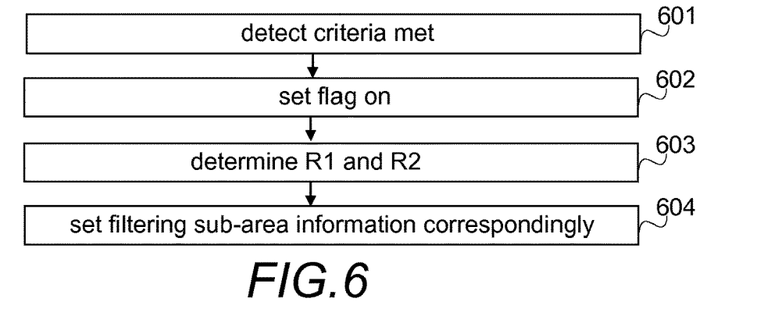
Figure 7:
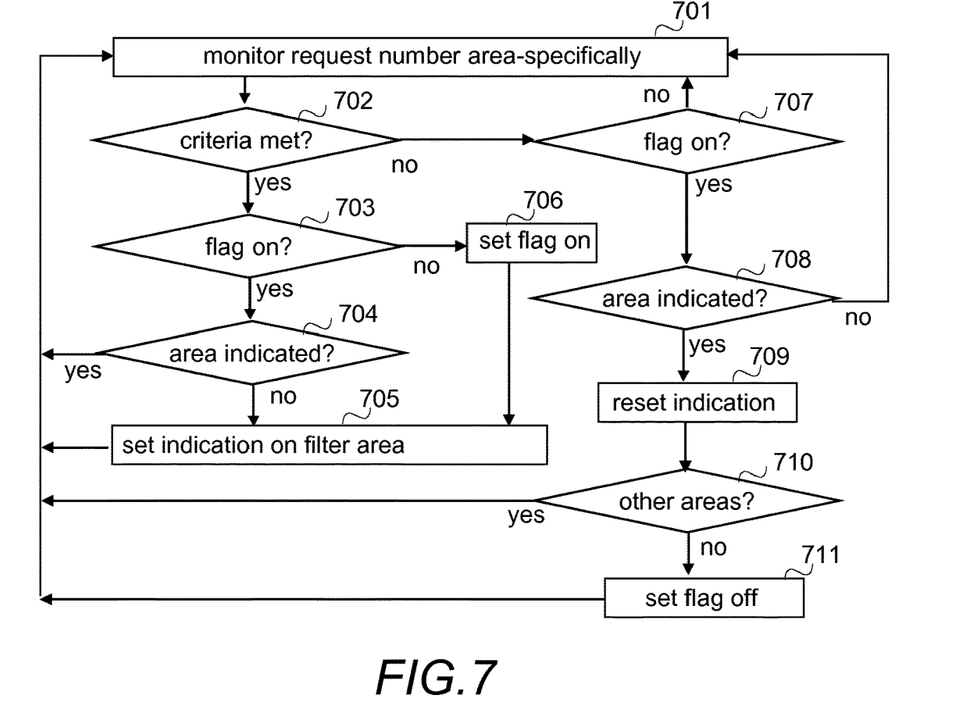

FIGS. 6 and 7 illustrate different examples how the distance filtering flag may be set on automatically in the base station. More precisely, they illustrate example functionalities of the distance filtering unit, or its sub-unit configured to perform a corresponding functionality.

Referring to FIG. 6, resource (capacity) usage, or its demand (requested resources), in the coverage area/cell is monitored until in block 601 it is detected that the criteria for distance filtering is met. For example, the capacity usage may be monitored with respect to the number of user devices served or with respect of data throughput. For example, if the single cell deployment scenario is in use, the criteria for distance filtering may be met when the demand for radio resources exceeds the maximum capacity or a threshold for the capacity, and/or an excessive number of service requests are received from a relative small area within the coverage area. (Detecting service requests small area specifically is known technique in the art. For example, the location based on timing advance information and on angle on arrival information. Naturally any other suitable technique may be used.) It may even be that one or couple of user devices with an extreme high request for data causes that the request for resources exceeds the resources available. Still a further possibility is that there is jamming device attack, which may be detected based on so-called denial of service technique, for example, as is known by one skilled in the art. Another example is that a base station providing a smaller cell, or part of it, within the coverage area is out of order, for example.

When it is detected (block 601) that the criteria for the distance filtering is met (block 601), the distance filtering flag is set on in block 602, and for the smaller area, or if there are several, for each of the smaller areas, the minimum range R1 and the maximum range R2 is determined in block 603. The ranges may be determined based on distances, either by determining the longest and shortest distance of user devices causing that the criteria is met, and using the distances, or the distances added with some safety marginal, or determining using the distances those initially defined range rings, such as the range ring within which the shortest distance is and range ring within which the longest distance is and any range ring there between, if any. Then the filtering sub-area information is updated correspondingly in block 604. For example, the range(s) within R1 and R2 may be indicated as "filter area", while the other ranges may be without any indication (thereby indicating indirectly "normal area"), or indicated as "normal area".

FIG. 7 illustrates an example in which predefined range rings are used, with a common flag. Further, it is assumed that the number of service request are monitored range ring-specifically, without restricting the example to such an implementation.

Referring to FIG. 7, the number of service requests are monitored as a background process in block 701 area-specifically (i.e. range ring-specifically). If statistics are collected, data can be collected as a background process of FIG. 7. The monitoring includes checking in block 702, whether or not the criteria for distance filtering is met. Examples of criteria and when it is met are given above. If the criteria is met (block 702: yes), it is checked in block 703, whether or not the distance filtering flag is on, i.e. has been set on previously. If the flag is on (block 703: yes), it is checked, whether or not the filtering sub-area (range ring) in question is indicated as a filter area (extensive demand area). If it already is indicated (block 704: yes), the monitoring continues in block 701. If the area is not yet indicated (block 704: no), an indication is set in block 705, and then the monitoring continues in block 701. If the flag is not on (block 703: no), the flag is set on in block 706 and then the process continues in block 705 by setting the indication.

If the criteria is not yet met (block 702: no), or not any more met for the sub-area in question, it is checked in block 707, whether or not the distance filtering flag is set on. If not (block 707: no), the monitoring continues in block 701. If the distance filtering flag is on (block 707: yes), it is checked in block 708, whether or not the sub-area is indicated as the filter area. If it is indicated as the filter area (block 708: yes), the indication is reset in block 709 to be nothing (or normal demand area), and then it is checked in block 710, whether or not any of the other areas is indicated as the filter area. If any of the other areas are indicated as the filter area (block 710: yes), the monitoring continues in block 701. If no other areas is indicated as the filter area (block 710: no), the distance filtering flag is set off in block 711 and the process continues the monitoring in step 701.

As is evident from the above examples, the described distance filtering enables, for example, isolation of groups with high radio resource demands, more efficient resource management, fair allocation of radio resources (those requesting more resources or in an ad hoc event, for example, know that there may be some temporary connection problems, so it is fair that the resources are allocated to those who cannot predict such problems), radio jamming impact minimization and versatile, and new cell deployment scenarios. For example, compared with beam forming, in which traffic is not processed at all within a beam, with the distance filtering and rules defining the distance filtering, it is possible to provide sub-areas with different traffic processing capacity, but there is no need to have areas in which traffic is not processed at all, it all depends on rules in the configuration. In other words, more flexibility and resource protection (optimization) is provided to network operators for improved cell configuration, enabling also use of self-adapting algorithms.

The blocks, related functions, and information exchanges described above by means of FIGS. 3 to 7 are in no absolute chronological order, and some of them may be performed simultaneously or in an order differing from the given one. For example, it is possible, e.g. with the examples of FIGS. 3 and 4, first to check whether or not the distance filtering is on, and to determine the distance only if the distance filtering is on. Other functions can also be executed between them or within them, and other information may be sent, and/or other rules applied. Some of the blocks or part of the blocks or one or more pieces of information can also be left out or replaced by a corresponding block or part of the block or one or more pieces of information.

In one example implementation the above described features relating to the distance filtering unit, the filtering configuration data and the other information relating to the distance filtering form a built-in Timing Advance Type 2 Range Filter comprising a range filter logic, a predefined range filter and a range filter counter. The range filter logic may be configured to determine when to set the filtering flag on, based on a sector reason and/or capacity reason, for example. The predefined range filter may comprise predefined range sectors, i.e. filtering sub-areas. The range filter counter may comprise predefined capacity limitations, i.e. the rules and/or triggers (criteria) described above. The range filter logic, the predefined range filter and the range filter counter, or any corresponding means or units may be implemented as separate circuitries, or combined, either all or two, for example, to one circuitry.

The techniques and methods described herein may be implemented by various means so that an apparatus/device configured to support distance mechanism based on at least partly on what is disclosed above with any of FIGS. 1 to 7, including implementing one or more functions/operations of a corresponding base station described above with an embodiment/example, for example by means of any of FIGS. 2 to 7, comprises not only prior art means, but also means for implementing the one or more functions/operations of a corresponding functionality described with an embodiment, for example by means of any of FIGS. 2 to 7, and it may comprise separate means for each separate function/operation, or means may be configured to perform two or more functions/operations. For example, one or more of the means and/or the distance filtering unit, or its sub-units, and/or the a built-in Timing Advance Type 2 Range Filter, or its sub-units, described above may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, logic gates, decoder circuitries, encoder circuitries, other electronic units designed to perform the functions described herein by means of FIGS. 1 to 7, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components described herein may be rearranged and/or complemented by additional components in order to facilitate the achievements of the various aspects, etc., described with regard thereto, and they are not limited to the precise configurations set forth in the given figures, as will be appreciated by one skilled in the art.

Figure 8:
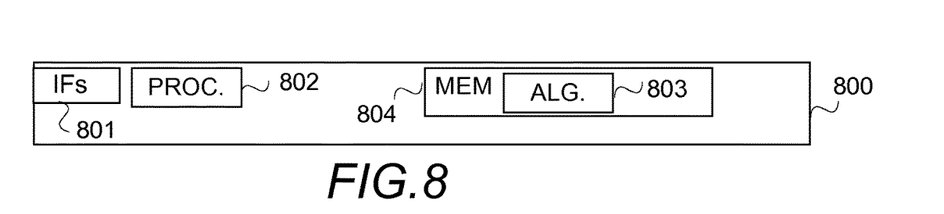
FIG. 8 is a schematic block diagram.

FIG. 8 provides a base station (apparatus, device) according to some embodiments. FIG. 8 illustrates a base station configured to carry out at least the functions described above in connection with distance filtering. Each base station may comprise one or more communication control circuitry, such as at least one processor 802, and at least one memory 804, including one or more algorithms 803, such as a computer program code (software) wherein the at least one memory and the computer program code (software) are configured, with the at least one processor, to cause the apparatus to carry out any one of the exemplified functionalities of the base station described above.

Referring to FIG. 8, at least one of the communication control circuitries in the apparatus 800 is configured to provide the distance filtering unit, or its sub-units, and/or the a built-in Timing Advance Type 2 Range Filter, or its sub-units, and to carry out functionalities and rules and criteria described above by means of any of FIGS. 2 to 7 by one or more circuitries.

Referring to FIG. 8, the memory 804 may be implemented using any suitable data storage technology, such as semiconductor based memory devices, flash memory, magnetic memory devices and systems, optical memory devices and systems, fixed memory and removable memory.

Referring to FIG. 8, the base station may further comprise different interfaces 801 such as one or more communication interfaces (TX/RX) comprising hardware and/or software for realizing communication connectivity over the medium according to one or more communication protocols. The communication interface may provide the base station with communication capabilities to communicate in the cellular communication system and enable communication between terminal devices and different network nodes and/or a communication interface to enable communication between different network nodes, for example. The communication interface may comprise standard well-known components such as an amplifier, filter, frequency-converter, (de)modulator, and encoder/decoder circuitries, controlled by the corresponding controlling units, and one or more antennas. The communication interfaces comprise radio interface components providing the base with radio communication capability to provide a cell. The communication interfaces may comprise optical interface components providing the base station with optical fibre communication capability.

As used in this application, the term 'circuitry' may refer to one or more or all of the following: (a) hardware-only circuit implementations, such as implementations in only analog and/or digital circuitry, and (b) combinations of hardware circuits and software (and/or firmware), such as (as applicable): (i) a combination of analog and/or digital hardware circuit(s) with software/firmware and (ii) any portions of hardware processor(s) with software, including digital signal processor(s), software, and memory(ies) that work together to cause an apparatus, such as a base station, to perform various functions, and (c) hardware circuit(s) and processor(s), such as a microprocessor(s) or a portion of a microprocessor(s), that requires software (e.g. firmware) for operation, but the software may not be present when it is not needed for operation. This definition of 'circuitry' applies to all uses of this term in this application, including any claims. As a further example, as used in this application, the term 'circuitry' also covers an implementation of merely a hardware circuit or processor (or multiple processors) or a portion of a hardware circuit or processor and its (or their) accompanying software and/or firmware. The term 'circuitry' also covers, for example and if applicable to the particular claim element, a baseband integrated circuit for a base station, or other computing or network device.

In embodiments, the at least one processor, the memory, and the computer program code form processing means or comprises one or more computer program code portions for carrying out one or more operations according to any one of the embodiments of FIGS. 2 to 7 or operations thereof.

Embodiments as described may also be carried out in the form of a computer process defined by a computer program or portions thereof. Embodiments of the methods described in connection with FIGS. 1 to 7 may be carried out by executing at least one portion of a computer program comprising corresponding instructions. The computer program may be provided as a computer readable medium comprising program instructions stored thereon or as a non-transitory computer readable medium comprising program instructions stored thereon. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to examples according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus comprising:
at least one processor; and
at least one memory including computer program code;
the at least one memory and computer program code configured to, with the at least one processor, cause the apparatus at least to:

detect that a distance filtering is on;
determine, from timing information in a service request received from a device, at least a distance to the device;
identify a filtering sub-area for the device based on the distance, wherein the filtering sub-area is associated with one or more filtering rules; and
apply the one or more filtering rules associated with the filtering sub-area to determine how to process the service request.

2. The apparatus of claim 1, wherein the service request is a random access channel preamble and the at least one memory and computer program code configured to, with the at least one processor, cause the apparatus to determine at least the distance to determine the distance based on guard time in the service request, or based on timing advance information calculated based on the random access channel preamble.

3. The apparatus of claim 1, the at least one memory and computer program code further configured to, with the at least one processor, cause the apparatus to:
detect one or more areas with an extensive demand on resources;
set the distance filtering on in response to detecting an area with an extensive demand; and
indicate for each area with an extensive demand a minimum range and a maximum range.

4. The apparatus of claim 3, wherein the at least one memory and computer program code configured to, with the at least one processor, cause the apparatus to detect one or more areas with an extensive demand on resources to be responsive to one or more of the following: detecting that demand for radio resources exceeds a threshold for capacity, detecting that number of service requests received from a relative small area exceeds a corresponding threshold, detecting a jamming device attack, detecting that a base station providing a smaller cell that is at least partly within a coverage area associated with the apparatus is out of order.

5. The apparatus of claim 1, the at least one memory and computer program code further configured to, with the at least one processor, cause the apparatus to receive filtering sub-area configurations including filtering sub-area definitions for one or more layers and one or more rules to apply.

6. The apparatus of claim 5, wherein the filtering sub-area configurations are for preventive coverage deployment.

7. The apparatus of claim 6, wherein the preventive coverage deployment is for interoperability between GSM and/or LTE and/or 5G.

8. The apparatus of claim 1, the at least one memory and computer program code further configured to, with the at least one processor, cause the apparatus to set the distance filtering on in response to receiving corresponding instructions.

9. The apparatus of claim 1, the at least one memory and computer program code further configured to, with the at least one processor, cause the apparatus to determine, in response to an indication of a filtering sub-area with an extensive demand on resources that the rule to apply for the filtering sub-area is not to send a response to the response request.

10. The apparatus of claim 1, wherein the one or more filtering rules comprise filtering sub-area-specific logical values and the apparatus is configured to multiply an input message received from the device using the logical value of the determined filtering sub-area.

11. The apparatus of claim 1, further comprising:
one or more memories for storing two or more filtering rules and information on which one of the filtering rules to apply to a filtering sub-area.

12. The apparatus of claim 1, the at least one memory and computer program code further configured to, with the at least one processor, cause the apparatus to collect statistical data on service request filtering sub-area-specifically.

13. The apparatus of claim 1, wherein the apparatus is comprised in an (e/g)NodeB base station.

14. A method comprising:
detecting that a distance filtering is on;
determining from timing information in a service request received from a device at least a distance to the device;
identifying a filtering sub-area for the device based on the distance, wherein the filtering sub-area is associated with one or more filtering rules; and
applying the one or more filtering rules associated with the filtering sub-area to determine how to process the service request.

15. The method of claim 14, wherein the service request is a random access channel preamble and the method further comprises determining the distance based on guard time in the service request, or based on timing advance information calculated based on the random access channel preamble decoding.

16. The method of claim 14, further comprising:
detecting one or more areas with an extensive demand on resources;
setting the distance filtering on in response to detecting an area with an extensive demand; and
indicating for each area with an extensive demand a minimum range and a maximum range.

17. The method of claim 16, wherein detecting one or more areas with an extensive demand on resources are to be responsive to one or more of the following: detecting that demand for radio resources exceeds a threshold for capacity, detecting that number of service requests received from a relative small area exceeds a corresponding threshold, detecting a jamming device attack, detecting that a base station providing smaller cell that is at least partly within a coverage area is out of order.

18. The method of claim 14, further comprising receiving filtering sub-area configurations including filtering sub-area definitions for one or more layers and one or more rules to apply.

19. The method of claim 18, wherein the filtering sub-area configurations are for preventive coverage deployment.

20. A non-transitory computer readable medium comprising instructions stored thereon for performing, in response to a distance filtering being on, at least the following:
determining from timing information in a service request received from a device at least a distance to the device;
identifying a filtering sub-area for the device based on the distance, wherein the filtering sub-area is associated with one or more filtering rules; and
applying the one or more filtering rules associated with the filtering sub-area to determine how to process the service request.

21. The non-transitory computer readable medium of claim 20, further comprising instructions for performing, when the service request is a random access channel preamble, determining the distance based on guard time in the service request, or based on timing advance information calculated based on the random access channel preamble.

* * * * *